(12) United States Patent
Fan et al.

(10) Patent No.: US 9,367,966 B2
(45) Date of Patent: Jun. 14, 2016

(54) SMARTPHONE AUGMENTED VIDEO-BASED ON-STREET PARKING MANAGEMENT SYSTEM

(75) Inventors: Zhigang Fan, Webster, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 494 days.

(21) Appl. No.: 13/461,161

(22) Filed: May 1, 2012

(65) Prior Publication Data

US 2013/0265426 A1 Oct. 10, 2013

Related U.S. Application Data

(63) Continuation-in-part of application No. 13/441,294, filed on Apr. 6, 2012, and a continuation-in-part of application No. 13/441,253, filed on Apr. 6, 2012, now Pat. No. 8,666,117.

(51) Int. Cl.
*G07B 15/02* (2011.01)
*G06K 9/00* (2006.01)
*H04N 7/18* (2006.01)

(52) U.S. Cl.
CPC ............ *G07B 15/02* (2013.01); *G06K 9/00785* (2013.01); *H04N 7/181* (2013.01)

(58) Field of Classification Search
None
See application file for complete search history.

(56) References Cited

U.S. PATENT DOCUMENTS

| 6,285,297 | B1 | 9/2001 | Ball |
| 7,482,927 | B2 * | 1/2009 | Livingston et al. ........ 340/572.1 |
| 7,688,225 | B1 * | 3/2010 | Haynes et al. ............. 340/932.2 |
| 2004/0068433 | A1 * | 4/2004 | Chatterjee et al. ............... 705/13 |
| 2004/0151342 | A1 | 8/2004 | Venetianer et al. |
| 2005/0270178 | A1 | 12/2005 | Ioli |
| 2007/0094069 | A1 * | 4/2007 | Berman .......................... 705/13 |

(Continued)

FOREIGN PATENT DOCUMENTS

| JP | 2003217080 | 7/2003 |
| JP | 2007164566 | 6/2007 |
| KR | 100867336 B | 11/2008 |

OTHER PUBLICATIONS http://www.nytimes.com/2011/09/19/nyregion/uprooting-the-old-familiar-parking-meter.html?_4=1&goback+%2Egde_153603_member_72027013, Dated Sep. 18, 2011; 3 pgs.

(Continued)

*Primary Examiner* — Sath V Perungavoor
*Assistant Examiner* — Janese Duley
(74) *Attorney, Agent, or Firm* — Fay Sharpe LLP

(57) ABSTRACT

A method and a system for automating parking payment includes receiving video data in a sequence of frames provided by a video capture device observing a parking area. The method includes detecting a vehicle in the parking area using the video data. The method further includes receiving information of a vehicle in the parking area provided by a user device. The method includes comparing the characteristics of the detected vehicle with the information from the user device. In response to the characteristics of the detected vehicle being a match to the information sent from the user device, the method includes tracking the detected vehicle across the sequence of frames. The method includes computing a duration that the detected vehicle remains stationary using the tracking. The method includes computing an amount for charging the associated user device based on the duration.

17 Claims, 5 Drawing Sheets

(56) References Cited

U.S. PATENT DOCUMENTS

| | | | |
|---|---|---|---|
| 2007/0152810 A1* | 7/2007 | Livingston et al. | 340/539.1 |
| 2011/0064268 A1 | 3/2011 | Cobb et al. | |
| 2012/0106801 A1* | 5/2012 | Jackson | 382/105 |
| 2012/0148105 A1 | 6/2012 | Burry et al. | |
| 2012/0263352 A1 | 10/2012 | Fan | |
| 2012/0274482 A1* | 11/2012 | Chen et al. | 340/932.2 |
| 2012/0280836 A1* | 11/2012 | Roesner | 340/932.2 |
| 2013/0028481 A1 | 1/2013 | Wu | |
| 2013/0258107 A1 | 10/2013 | Delibaltov et al. | |

OTHER PUBLICATIONS www.streetsmarttechnology.com, retrieved from the internet Aug. 6, 2012, 10 pgs.

Wren et al., "Pfinder: Real-Time Tracking of the Human Body", in IEEE Transactions on Pattern Analysis and Machine Intelligence, Jul. 1997, vol. 19, No. 7, pp. 780-785.

Friedman et al., "Image segmentation in video sequences: A probabilistic approach", in Proc. of the Thirteenth Conference on Uncertainty in Artificial Intelligence (UAI), Aug. 1-3, 1997.

Stauffer et al., "Adaptive background mixture models for real-time tracking", in Proc. of the 1999 Conference on Computer Vision and Pattern Recognition (CVPR '99), pp. 2246-2252, 1999.

Makarov et al., "Intrusion detection using extraction of moving edges", in $12^{th}$ IAPR Int. Conf. on Pattern Recognition, vol. 1 of IAPR, pp. 804-807, IEEE Press, 1994.

Paragious et al., "Detection and location of moving objects using deterministic relaxation algorithms", in ICPR, No. 13, pp. 201-286, Vienna, Austria, Aug. 1996.

http://www.alibaba.com/product-gs/373281312/Ultrasonic_Parking_Sensor.html, retrieved from the internet Mar. 28, 2012; 4 pgs.

Oliver et al., "A Bayesian Computer Vision System for Modeling Human Interactions", IEEE Transactions on PAMI, pp. 831-843.

Lo et al., "Automatic congestion detection system for underground platforms," Proc. of 2001 Int Symp. on Intell. Multimedia, Video and Speech Processing, pp. 158-161.

Prati et al., "Shadow Detection Algorithms for Traffic Flow Analysis: a Comparative Study", In Proc. IEEE Intelligent Transportation Systems, 2001.

Cucchiara et al., "Improving Shadow Suppression in Moving Object Detection with HSV Color Information", Proc. of IEEE Intelligent Transportation Systems, 2001.

Zhang, "A flexible new technique for camera calibration", IEEE Trans. on Pattern Analysis and Machine Intelligence, vol. 22 (11), pp. 1330-1334 (2000).

http://www.nyc.gov/html/dof/html/parking/park_tickets_violations.shtml, retrieved from the internet Aug. 6, 2012.

http://wvvw.sanjoseca.gov/transportation/onstreet_regulations.htm, retrieved from the internet Aug. 6, 2012.

http://www.portlandoregon.gov/transportation/article/59926, retrieved from the Internet Aug. 6, 2012.

http://vancouver.ca/bylaws/2849c.pdf, Street and Traffic By-Law No. 2849, Oct. 18, 2011.

http://parkitnyc.com/parking-nyc/nyc-parking-tickets/, retrieved from the internet Aug. 6, 2012.

Agarwal et al., "Learning to detect objects in images via a sparse, part-based representation", Pattern Analysis and Machine Intelligence, IEEE Transactions on, vol. 26, No. 11, pp. 1475-1490, Nov. 2004.

Tsai et al., "Vehicle Detection Using Normalized Color and Edge Map," Image Processing, IEEE Transactions on, vol. 16, No. 3, pp. 850-864, Mar. 2007.

Duncan, et al., "Temporal edges: The detection of motion and the computation of optical flow", in Proc. Second Int. Conf. Comput. Vision, Tampa, FL, Dec. 1988, pp. 374-382.

Comaniciu et al., "Real-time tracking of non-rigid objects using mean shift", in: Proceedings of IEEE Conference on Computer Vision and Pattern Recognition (CVPR'00), South Carolina, 2000, pp. 142-149.

Kass et al., "Snakes: Active Contour Models", Int'l Journal of Computer Vision, pp. 321,331, 1988.

Dickmanns et al., "Dynamic monocular machine vision", Machine Vision and Applications 1: 1223-240, 1988.

Gustafsson et al., "Particle Filters for Positioning, Navigation and Tracking", IEEE Transactions on Signal Processing, 2002.

http://en.wikipedia.org/wiki/Hough_transform, "Hough transform", retrieved from the internet Aug. 6, 2012, last modified Aug. 1, 2012.

Ma et al., "Edge-based rich representation for vehicle classification", Proc. of IEEE Computer Vision (ICCV), 2005.

GB Search Report, Application No. GB1305903.5, Date of Search Sep. 27, 2013.

* cited by examiner

SMARTPHONE AUGMENTED VIDEO-BASED ON-STREET PARKING MANAGEMENT SYSTEM

INCORPORATION BY REFERENCE

This application claims the priority, as a continuation-in-part, of co-pending U.S. application Ser. No. 13/441,294, filed on Apr. 6, 2012 and entitled "Video-Based Detector and Notifier For Short-Term Parking Violation Enforcement", by Edgar Bernal et al.; and application Ser. No. 13/441,253, filed Apr. 6, 2012 entitled "Video-Based System and Method for Detecting Exclusion Zone Infractions", by Orhan Bulan et al., each of which is incorporated herein in their entireties.

BACKGROUND

The disclosure relates to a video-based on-street parking management system that automates the monitoring of parking spaces and collection of parking fees. The disclosure finds application in parking space management and enforcement. However, it is appreciated that the present exemplary embodiments are also amendable to other like applications.

Traditionally, parking management is performed by using meters that receive coin payments and display readings correlating to a remaining time-value. However, meters are being phased out for a number of reasons. Namely, the operation of meters is costly in labor required for inspection and in fines lost from undetected violations. Single stall meters are furthermore undesirable because they inefficiently use space by requiring that one meter accommodate every one or two parking spots. Furthermore, because the payment is temporarily contained within the meters, they are susceptible to vandalism and theft.

Sensor-based solutions were recently proposed for monitoring parking spaces and tracking vehicles occupying the spaces. For example, "puck-style" sensors and ultrasonic ceiling or in-ground sensors output a binary signal when a vehicle is detected in a parking space. The detected information is wirelessly communicated to a user device. One aspect of this solution is that it reduces the labor costs associated with meters. However, a disadvantage associated with these sensor-based methods is a high cost for installation and maintenance of the sensors.

One shortcoming of sensor technologies is that they are designed for, and limited to, single-space parking configurations. On-street parking can be provided in two different configurations. A first configuration includes single-space parking, also known as stall-based parking, in which each parking space is defined in a parking area by clear boundaries. The parking spaces are typically marked by lines that are painted on the road surface to designate one parking space per vehicle. The second configuration is shown in FIG. 1 and includes multi-space parking, in which a long section of street is designated as a parking area to accommodate multiple vehicles. In this configuration, there are no pre-defined boundaries that designate individual parking stalls, so a vehicle can park at any portion extending along the parking area. In many instances, the multi-space parking configurations are more efficient because, when spaces are undesignated, drivers aim to fit more vehicles in a multi-space parking area having a same length as a single-space parking area. However, sensors are difficult to integrate with parking payment systems in multi-space parking areas.

Another technique that is being explored for enforcing parking regulations is a video-based solution. This method includes monitoring on-street parking spaces using non-stereoscopic video cameras. The video-based system outputs a binary signal to a processor, which uses the data for determining occupancies of the parking spaces. The known techniques are adapted to capture a parking area. However, one challenge associated with the video-based system is enforcement. It is difficult to obtain license plate information from a vehicle that is tightly parked (see FIG. 1). The violation cannot be enforced without accurately identifying the vehicle in violation.

There is needed an on-street parking management system that is adapted to receive and use vital parking information providing by and/or on behalf of a driver for determining parking time and automating fee collection.

CROSS REFERENCE TO RELATED PATENTS AND APPLICATIONS

This application is related to co-pending application Ser. No. 13/461,191, filed herewith, entitled "A System and Method for Street-Parking-Vehicle Identification Through License Plate Capturing", by Yao Rong Wang et al., the application of which is incorporated herein in its entirety.

BRIEF DESCRIPTION

Embodiments of the present disclosure relate to a method and a system for automating parking payment. The method includes receiving video data in a sequence of frames provided by a video capture device observing a parking area. The method includes detecting a vehicle in the parking area using the video data. The method further includes receiving information by a user device. The method includes comparing the characteristics of the detected vehicle with the information sent from the user device. In response to the characteristics of the detected vehicle being a match to the information sent from the user device, the method includes computing a duration that the detected vehicle remains stationary. The method includes computing an amount for charging the associated user device based on the duration.

DETAILED DESCRIPTION

The disclosure relates to a video-based on-street parking management system that automates the monitoring of parking spaces and collection of parking fees. More specifically, the system includes a managing device that is adapted to receive an image and/or video of a vehicle transmitted from a user device, such as a smart phone operated by a driver. The system is adapted to detect vehicles in a video feed provided by a camera monitoring a parking area. The system identifies the vehicle by matching the characteristics of a detected vehicle with the information sent from a user device. The example of the characteristics includes location, time, license plate number, and/or other features of the parking vehicle. In response to the matching, a timer is initiated and the system computes a duration that the vehicle is parked in the parking space and then charges a fee to an account corresponding to the user device.

Figure 1:
FIG. 1 shows an example multi-space street-parking environment for when the present disclosure can be applied.
Figure 2:
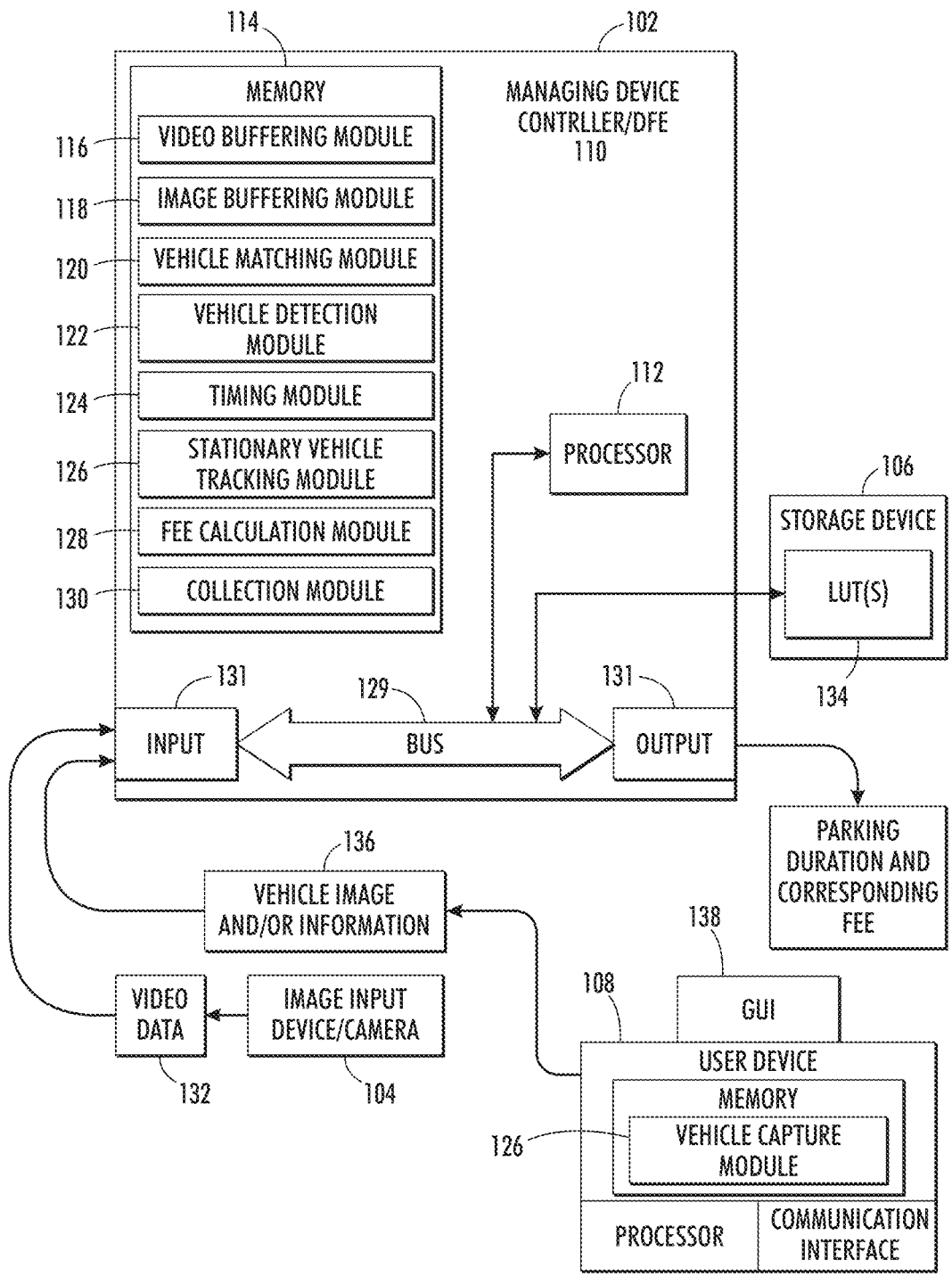
FIG. 2 is a schematic illustration of a parking management system according to one embodiment.

FIG. 2 is a schematic illustration of a parking management system 100 in one exemplary embodiment. The system includes a managing device 102, an image capture device 104, a storage device 106, and a user device 108, which may be linked together by communication links, referred to herein as a network. These components are described in greater detail below.

The managing device 102 illustrated in FIG. 2 includes a controller 110 that is part of or associated with the managing device 102. The exemplary controller 110 is adapted for controlling an analysis of video data received by the system 100. The controller 110 includes a processor 112, which controls the overall operation of the managing device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the managing device 102, executes instructions stored in memory 114 for performing the parts of the method outlined in FIGS. 4 and 5. In some embodiments, the processor 112 and memory 114 may be combined in a single chip.

The managing device 102 may be embodied in a networked device, such as the image capture device 104 or user device 108, although it is also contemplated that the managing device 102 may be located elsewhere on a network to which the system 100 is connected, such as on a central server, a networked computer, or the like, or distributed throughout the network or otherwise accessible thereto. The vehicle detection, matching, and fee calculation phases disclosed herein are performed by the processor 112 according to the instructions contained in the memory 114. In particular, the memory 114 stores a video buffering module 116, which receives video of a select parking area that is captured by a video capture device; an image buffer module 118, which receives images provided by the user device; a vehicle matching module 120, which matches a vehicle in the video data with a vehicle in the image; a stationary vehicle detection module 122, which detects objects and/or vehicles within a field of view of the camera; a timing module 124, which initiates a timer for measuring a duration that the detected vehicle remains parked in the space; a vehicle tracking module 126, which tracks a motion of the vehicle to indicate when the vehicle departs from the parking area; a fee calculation module 128, which computes a fee corresponding to the duration; and, a collection module 130, which charges an account associated with the user device. Embodiments are contemplated wherein these instructions can be stored in a single module or as multiple modules embodied in the different devices. The modules 116-130 will be later described with reference to the exemplary method.

The software modules as used herein, are intended to encompass any collection or set of instructions executable by the managing device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the managing device 102 may be all connected by a bus 129.

With continued reference to FIG. 2, the managing device 102 also includes one or more communication interfaces 131, such as network interfaces, for communicating with external devices. The communication interfaces 131 may include, for example, a modem, a router, a cable, and and/or Ethernet port, etc. The communication interfaces 131 are adapted to receive video and/or image data 132 as input.

The managing device 102 may include one or more special purpose or general purpose computing devices, such as a server computer or digital front end (DFE), or any other computing device capable of executing instructions for performing the exemplary method.

FIG. 2 further illustrates the managing device 102 connected to an image source 104 for inputting and/or receiving the video data and/or image data (hereinafter collectively referred to as "video data") in electronic format. The image source 104 may include an image capture device, such as a camera. The image source 104 can include one or more surveillance cameras that capture video data from the parking area of interest. The number of cameras may vary depending on a length and location of the area being monitored. It is contemplated that the combined field of view of multiple cameras typically comprehends all parking spaces in the parking area. For performing the method at night in parking areas without external sources of illumination, the cameras 104 can include near infrared (NIR) capabilities at the low-end portion of a near-infrared spectrum (700 nm-1000 nm).

In one embodiment, the image source 104 can be a device adapted to relay and/or transmit the video captured by the camera to the managing device 102. In another embodiment, the video data 132 may be input from any suitable source, such as a workstation, a database, a memory storage device, such as a disk, or the like. The image source 104 is in communication with the controller 110 containing the processor 112 and memories 114.

With continued reference to FIG. 2, the system 100 includes a storage device 106 that is part of or in communication with the managing device 102. In a contemplated embodiment, the managing device 102 can be in communication with a server (not shown) that includes a processing device and memory, such as storage device 106, or has access to a storage device 106, for storing look-up tables (LUTs) that associates maximum allowable parking times for particular parking spaces. The storage device 106 includes a repository, which stores at least one (previously generated) look-up-table (LUT) 134 for each particular camera used by the system 100. The storage device can also include a LUT that associates account information with user devices that are previously registered with the system.

With continued reference to FIG. 2, the system includes a user device 108 in communication with the managing device 102. The user device 108 can include a hand-held computer belonging to a driver and/or passenger of a vehicle, such as smart phone or tablet. The user device 108 can alternatively include a vehicle computer and/or GPS system located in the vehicle that is in communication with the managing device 102. In one embodiment, the user device 108 is a hand-held computer with camera capabilities, thus including an image capture device. The user device 108 includes a processing device 140 and memory, such as storage device 142, or has access to a storage device 142, for storing software modules executable by the processing device 140. The storage device 142 stores software instructions for implementing the user-side parts of the exemplary method shown in FIGS. 4 and 5. In particular, the instructions include a vehicle capture module 144, which captures and relays at least one image of the vehicle to the managing device 102. The user device 108 further includes a communication interface 146 including hardware and/or software suitable for providing wired or wireless data communication with the managing device 102. The memory 142, processor 140, and communication interface 146 can be similarly configured to memory 114, processor 112, and input/output devices 131 of the managing device controller 102.

The user device 108 further includes a graphic user interface (GUI) 138, which receives information input by the user. The GUI can include an input device, such as a keyboard or touch or writable screen, for receiving instructions and user and/or vehicle information as input, and/or a cursor control device, such as a mouse, trackball, or the like, for communicating user input information and command selections to the processor 140. The GUI can further include a display for displaying information, such as a confirmation from the managing device 102 indicating that the image and/or information was transmitted, a total duration that the vehicle is parked in the space, parking regulations and conditions corresponding to the parking space, a current and/or final fee amount due and/or charged for parking in the space, and a combination of the above.

Figure 3:
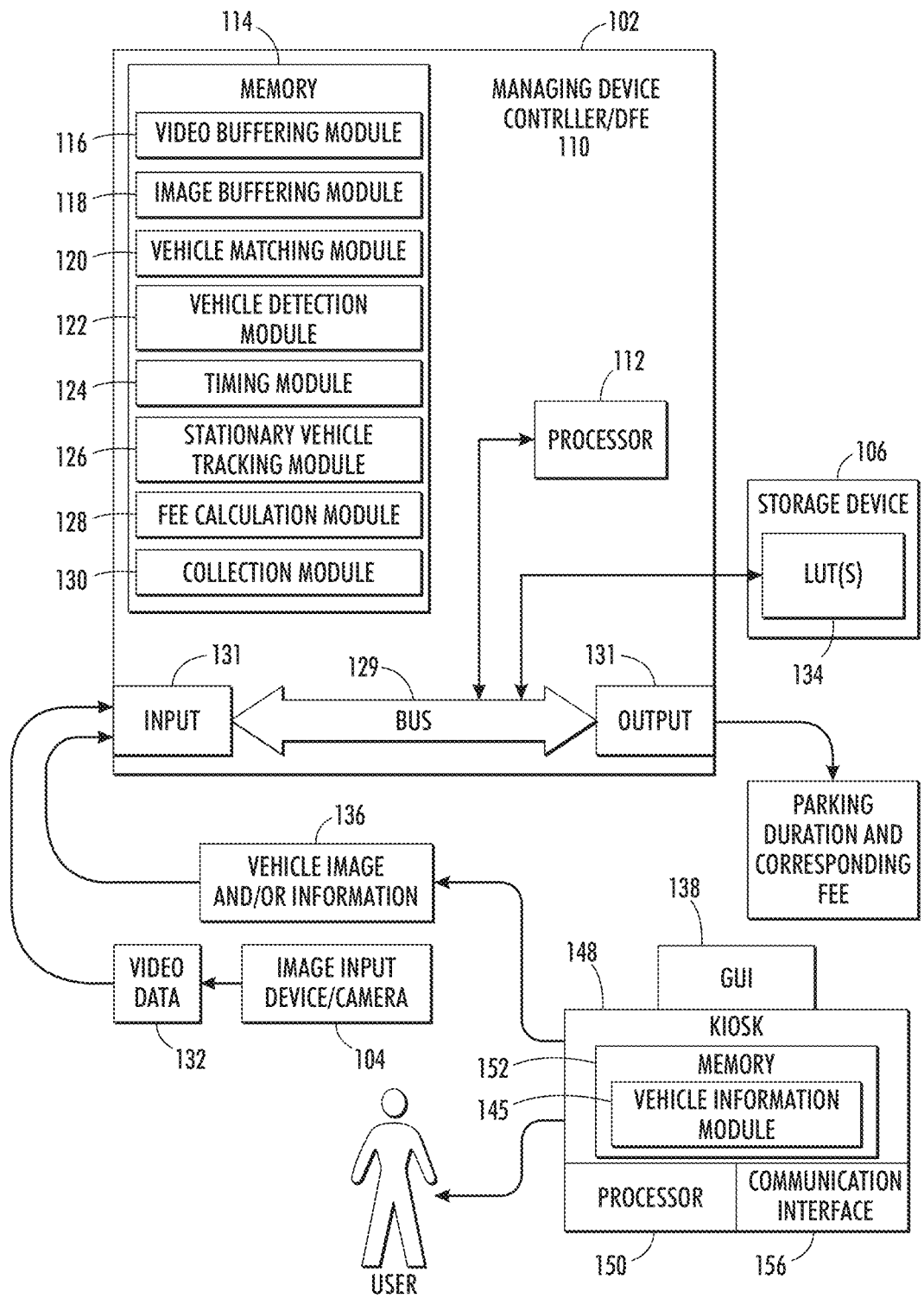
FIG. 3 is a schematic illustration of a parking management system according to another embodiment.

With reference to FIG. 3, an alternate embodiment of the system includes a kiosk 148 in communication with the managing device 102. The kiosk 148 can include a computer belonging to the parking and/or traffic management and/or enforcement company. In one embodiment, the kiosk 148 includes GUI that is adapted to receive user input. The kiosk 148 includes a processing device 150 and memory, such as storage device 152, or has access to a storage device 152, for storing software modules executable by the processing device 150. The storage device 152 stores software instructions for implementing the user-side parts of the exemplary methods shown in FIGS. 4 and 5. In particular, the instructions include a vehicle and driver information module 145, which receives information as input and relays the information to the managing device 102. The kiosk 148 further includes a communication interface 156 including hardware and/or software suitable for providing wired or wireless data communication with the managing device 102. The memory 152, processor 150, and communication interface 156 can be similarly configured to memory 114, processor 112, and input/output devices 131 of the managing device controller 102.

Figure 4:
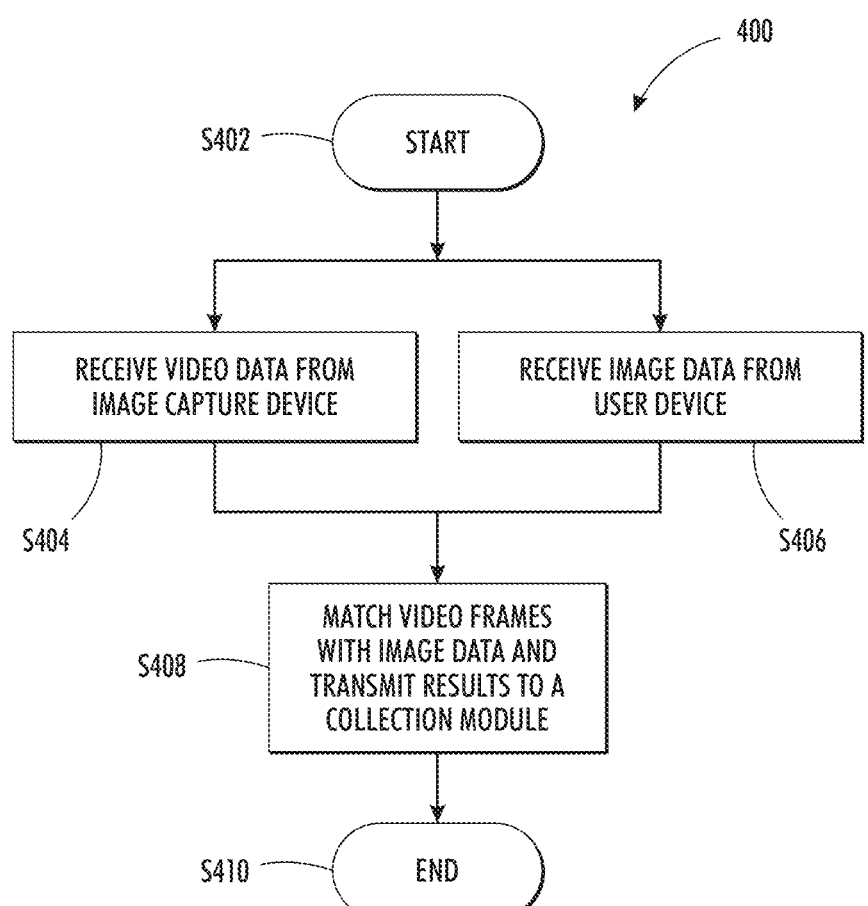
FIG. 4 is a flowchart describing an overview of a method for identifying a parked vehicle using the management system of FIG. 2.

With reference to FIG. 4, a flowchart describes a method 400 for managing parking. The method starts at S402. A video buffering module 116 receives video data from a sequence of frames taken from at least one video capture device 104 monitoring a parking area including at least one parking space at S404. In an on-street parking scenario, the at least one video capture device 104 is positioned along the street. A side of the street, and hence a side of the parking area, is observable in the camera field of view. Accordingly, the video buffering module 116 transmits the video data to a vehicle matching module 120.

During the processing of the instructions of the video data, an image buffer module 118 receives image data from at least one user device 108 at S406. In one embodiment, the user device is a camera-equipped smartphone that is adapted to capture a select image and transmit the image to the image buffer module 118. In another embodiment, the user device 108 is rather a tablet computer. In the contemplated embodiment, the user device 108 is a hand-held computer that the user carries, points at the vehicle, captures an image of the vehicle, and relays the image to the image buffering module 118.

In yet another embodiment, the user device 108 is a kiosk that is in communication with a camera. In this scenario, a camera that observes at least one parking space in an area can communicate an image of a vehicle in that parking area to a kiosk. The kiosk can selectively upload the image data to the image buffering module 118. In yet another embodiment, the user device can include a kiosk that receives user-inputs and uploads the user inputs to the module 118. In this scenario, the user input can be provided by a driver of a vehicle that is occupying the space and can include a user name; a user identification including, for example, a login and password; a vehicle license plate number; a vehicle description; or a combination of the above. In another embodiment, the user can be a manager of the parking area who is operating the kiosk for a number of spaces. In yet another embodiment, the user device 108 can include a GPS or vehicle computer that is adapted to selectively communicate information about the vehicle and/or registrant of the vehicle to the image buffer module 118 when the registrant, driver, or passenger of the vehicle selectively occupies a space.

According to the present disclosure, the image and/or information are communicated to the image buffer module 118 at a time proximate to when the vehicle parks in a parking space. Depending on the type of user device 108 used to communicate the information, the information can be automatically communicated or it can be selectively communicated in response to user input. The information is subsequently used by the system to initiate a monitoring of the select vehicle for purposes of tracking the vehicle, measuring a duration that the select vehicle is parked, and charging the registrant of the vehicle a fine and/or a fee based on the duration.

The image buffer module 118 transmits the image to the vehicle matching module 120. In response to the image buffer module 118 receiving the image, the matching module 120 determines whether a vehicle that is detected in a frame of the processed video data is the same vehicle that is represented in the image received from the user device (or described by the user input that was relayed from the image user device) at S408. Generally, the module 120 characterizes the vehicle in the image and compares the characteristics with the features in the video data to verify that the vehicles are the same in both the frame and the image. Any standard method in the art may be used to characterize the vehicle in the frame and image. For example, module 120 can determine whether the features, such as location, parking time, color, and shape characteristics, of the foreground object in a frame of the video data substantially match the features of the vehicle in the image data. Accordingly, the vehicle in the image can be characterized in the same manner as the vehicle in the frame. There is no limitation made herein to the process used for comparing and matching the vehicles. Similarly, a combination of processes may be performed.

In response to the vehicle in the frame matching the vehicle in the image, the vehicle matching module 120 transmits the information to a fee/fine collection module 130 to initiate a process for charging and collecting fees from the user device 108. The method ends at S410.

Figure 5:
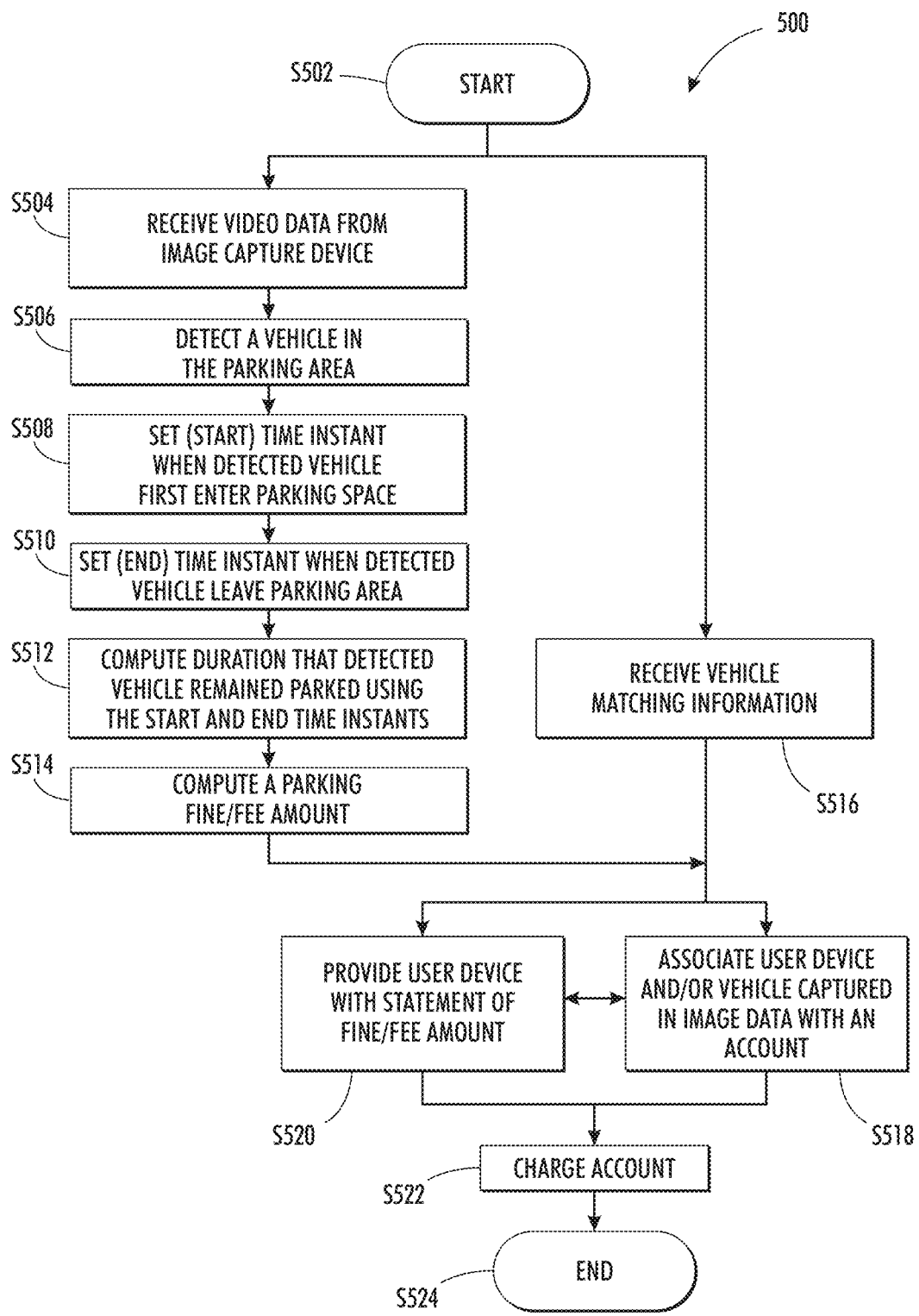
FIG. 5 is a flowchart describing a method for charging and collecting a parking fine/fee for the parking of the identified vehicle in FIG. 4.

FIG. 5 is a flowchart describing a method 500 for charging and collecting a parking fine/fee for the parking of the identified vehicle in FIG. 4. The method starts at S502. The video buffering module 116 receives video data from a sequence of frames at S504. The module 116 transmits the video data to a vehicle detection module 122.

The vehicle detection module 122 analyzes the frames. Generally, the vehicle detection module 122 processes each frame of the sequence to detect the objects-in-motion in a parking area and determine whether a detected object is in-fact a vehicle located in the parking area at S506. There is no limitation made herein to a process used for determining the presence of the vehicle. Example processes can include background subtraction, temporal difference, optical flow, occlusion detection, shadow suppression, or a combination of the above, etc. Example processes are described in co-pending application Ser. No. 13/441,294, filed on Apr. 6, 2012 and entitled "Video-Based Detector and Notifier For Short-Term Parking Violation Enforcement", by Edgar Bernal et al., the contents of which is incorporated herein in its entirety.

The vehicle detection module 122 transmits the detected vehicle information to a timing module 124 to initiate a timer for measuring a duration that the detected vehicle entering the parking area. The timing module 124 starts a timer at S508. Alternatively, the timing module 124 can determine a first time $t_{start}$ corresponding to the time instant when the detected vehicle first entered a parking space in the parking area at S508.

With continued reference to FIG. 5, a vehicle tracking module 126 tracks the detected vehicle from at least the time instant when it parks until at least a time instant when it subsequently departs from the parking area. There is no limitation made herein to a process used for tracking the detected vehicle. Example processes for tracking the stationary vehicle across the sequence of frames can be achieved by one of point tracking, primitive geometric shape tracking, contour tracking, tracking based on the probability density function of the appearance of the object, tracking based on template matching, optical flow, mean-shift tracking, KLT, Kalman and Particle Filtering, or a combination of the above, etc. Example processes are described in co-pending application Ser. No. 13/441,294, the contents of which are incorporated herein. Further example processes for tracking the stationary vehicle across the sequence of frames can be achieved by correlating the pixels of the detected vehicle from one frame to the pixels of the same location at the subsequent frame. High correlation indicates the stationary vehicle still being present, while low correlation indicates the stationary vehicle being left. Another process can include updating backgrounds, which is described in co-pending application Ser. No. 13/441,253, filed Apr. 6, 2012 entitled "Video-Based System and Method for Detecting Exclusion Zone Infractions", by Orhan Bulan et al., each of which is incorporated herein in its entirety. The '253 application further discloses a process for computing a duration using the updating process. Generally, a first frame is determined as having an updating factor p being equal to "0" for a select pixel belonging to a vehicle at a select location in the parking area. The number of consecutive frames having the updating factor being equal to "0" for pixels located at corresponding locations to the first frame is next determined. The number of frames is converted to duration.

With continued reference to FIG. 5, the vehicle tracking module 126 determines the time instant when the detected vehicle leaves the parking area. The module 126 transmits the detected vehicle information to the timing module 124, which stops the timer at S510. Alternatively, the timing module 124 can determine a second time $t_{end}$ corresponding to the time instant when the detected vehicle moves away from the parking space using the tracking information.

The timing module 124 determines the elapsed time between the first time $t_{start}$ and the second time $t_{end}$ at S512. The module 124 computes this time as a duration that the detected vehicle is parked in the parking area. The module 124 provides this time to a fee calculation module 128.

The fee calculation module 128 uses this time information to calculate a parking fine and/or fee at S514. In response to the parking area being an enforced, short-term parking area or an area that is regulated by a code that limits the parking time, the duration can be compared to a threshold. The threshold can be the maximum allowable parking time for the parking area and/or space of interest. This threshold can be obtained by an LUT 134 stored in the storage device 106. The LUT can associate allowable time limits for parking in the particular spaces under surveillance.

The system provides no action when the duration does not meet the threshold. When the duration meets or exceeds the threshold, the system triggers a warning for a short-term parking violation and computes the fine based on the type of violation. The module 128 transmits the computed parking fine amount to the fine/fee collection module 130. A notification can also be provided to a user device 104 indicating that the vehicle violated the parking regulation.

In response to the parking area rather being a managed parking area that charges for parking based on, for example, predetermined rates, the fee calculation module 128 can compute a fee at S514 based on the duration. The module 128 can refer to a LUT 138 in the storage device 106 for associating an amount based on the parking time. For example, parking areas, such as private parking garages, can charge an hourly rate, a daily rate, and/or a reduced rate for the first quarter-hours. The example is not limiting, but is described herein to set forth an illustration of the present fee computation.

Once the fine and/or fee are computed, the charge amount can be sent to the fine/fee collection module 130. The collection module 130 is adapted to charge an account of the registrant of the vehicle. In this manner, the collection module 130 receives the vehicle matching information transmitted from the vehicle matching module 120 at S516. The collection module 130 associates the vehicle in the image with a vehicle account at S518. In one embodiment, the user provides the account information when it registers with the system, for example, by downloading a relevant application to its user device 104. The vehicle account information can be stored in an LUT. The LUT can output the account information in response to user- and/or automatic inputs that can include, but are not limited to, at least one of a vehicle description, a vehicle license plate number, a user device identification, and a user (such as a driver, a passenger, and a registrant) name, etc.

The system is adapted to deduct the fine/fee amount from the determined account at S520. One aspect of this system is that the entire process of charging and collecting fines and/or fees for parking can be performed automatically. The collection module 130 can further send a receipt providing the user with the charge amount that is automatically deducted from the account.

In an alternate scenario, the user can provide the user device with the account information in response to being provided with a statement of the fine/fee amount at S520. In response to the user providing the account information, the collection module can associate the account information with a vehicle parking account number at S518. The fine/fee can be deducted from the provided account at S522. The method ends at S524 after the fine/fee is charged and/or collected.

Although the control methods 400 and 500 are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for automating parking payment, the method comprising:
    receiving video data in a sequence of frames provided by an associated video capture device observing an on-street parking area;
    detecting a vehicle in an on-street parking area using the video data;
    tracking the detected vehicle across the sequence of frames;
    characterizing the detected vehicle in the video data;
    computing a duration that the detected vehicle remains stationary in the parking area using the tracking;
    receiving vehicle image data from an associated hand-held user device belonging to an occupant of a vehicle;
    characterizing the vehicle image data;
    comparing characteristics of the characterized vehicle with the characterized vehicle image data; and,
    in response to matching the characteristics of the characterized vehicle with those from the characterized vehicle image data, charging the associated hand-held user device a parking fee based on the duration.

2. The method of claim 1 further comprising:
    detecting a time instant when the detected vehicle leaves the parking area.

3. The method of claim 1, wherein the detecting is performed by one of background subtraction, temporal difference, optical flow and an initialization process.

4. The method of claim 1, wherein the associated hand-held user device is a smartphone with camera capabilities.

5. The method of claim 1 further comprising:
    associating the associated hand-held user device with an account.

6. The method of claim 5 further comprising:
    deducting the charge amount from the account.

7. The method of claim 1 further comprising:
    providing the associated hand-held user device with a statement.

8. A computer program product comprising tangible media which encodes instructions for performing the method of claim 1.

9. A system for determining a parking violation comprising:
    a detection device comprising memory which stores instructions for performing the method of claim 1 and a processor, in communication with the memory for executing the instructions.

10. A system for automating parking payment, the system comprising a processor and a non-transitory computer readable memory storing instructions that are executable by the processor for:
    receiving video data in a sequence of frames provided by an associated video capture device observing an on-street parking area;
    detecting a vehicle in the parking area using the video data;
    tracking the detected vehicle across the sequence of frames;
    characterizing the detected vehicle in the video data;
    computing a duration that the detected vehicle remains stationary in the parking area using the tracking;
    receiving vehicle image data from an associated hand-held user device belonging to an occupant of a vehicle;
    characterizing the vehicle image data;
    comparing characteristics of the characterized vehicle with the; and, in response to matching the characteristics of the characterized vehicle with those from the characterized vehicle image data, charging the associated hand-held user device a parking fee based on the duration.

11. The system of claim 10, wherein the processor further tracks the detected vehicle across the sequence of frames for detecting a time instant when the detected vehicle leaves the parking area.

12. The system of claim 10, wherein in response to the vehicle detection module detecting the vehicle, the processor further initiates a timer for measuring the duration.

13. The system of claim 10, wherein the processor further performs one of background subtraction, temporal difference, optical flow and an initialization process.

14. The system of claim 10, wherein the associated hand-held user device is a smartphone with camera capabilities.

15. The system of claim 10 wherein the processor further associates the associated hand-held user device with an account.

16. The system of claim 15, wherein the processor further deducts the charge amount from the account.

17. The system of claim 10 wherein the processor further provides the associated hand-held user device with a statement.

* * * * *